UNITED STATES PATENT OFFICE.

CARLE R. HAYWARD, OF QUINCY, FREDERICK O. STILLMAN, OF CAMBRIDGE, AND HENRY M. SCHLEICHER, OF BOSTON, MASSACHUSETTS, ASSIGNORS, BY MESNE ASSIGNMENTS, TO MOA IRON & DEVELOPMENT CORPORATION, OF DOVER, DELAWARE, A CORPORATION OF DELAWARE.

TREATMENT OF IRON ORES.

1,341,901. Specification of Letters Patent. Patented June 1, 1920.

No Drawing. Application filed July 24, 1918. Serial No. 246,471.

*To all whom it may concern:*

Be it known that we, CARLE R. HAYWARD, FREDERICK O. STILLMAN, and HENRY M. SCHLEICHER, all citizens of the United States of America, and residents, respectively, of Quincy, in the county of Norfolk, Cambridge, in the county of Middlesex, and Boston, in the county of Suffolk, all in the State of Massachusetts, have invented new and useful Improvements in the Treatment of Iron Ores, of which the following is a specification.

This invention relates to the treatment of iron ore or iron bearing material referred to hereinafter simply as ore or iron ore, which contains incidental metals consisting of aluminum and also of one or more of the metals nickel, manganese and chromium, for the purpose of extracting or recovering alumina, and one or more of the other incidental metals either separated or as mixtures or alloys, while at the same time improving the quality of the ore for subsequent treatment in making pig iron and steel. A further purpose is to produce a valuable pigment if desired. Other purposes are to attain efficiency and economies in the recovery of the desired constituents, as hereinafter described and particularly pointed out in the claims.

The process is peculiarly though not exclusively adapted to the treatment of such ores as the soft iron ores on the north coast of the island of Cuba, which occur as blanket deposits on top of the rocks forming that part of the island. These ores consist essentially of oxids or oxids and silicates of iron and aluminum, and contain also small amounts of the metals nickel, manganese and chromium together with much water.

It is believed that the principal utility of the present process is in connection with the treatment of such ores as said Cuban iron ores for the ultimate recovery of nickel, and for the beneficiation of the iron ore for subsequent smelting. The presence of aluminum is detrimental to the recovery of the nickel and is also detrimental to the iron ore for subsequent treatment to produce pig iron and steel, and therefore its removal is desirable. Incidentally the aluminum is recovered for its own sake, and for use in performing part of the process of recovering other constituents, as hereinafter more fully described.

While the invention is not limited to the treatment of said Cuban iron ores but is applicable to other ores possessing similar characteristics, the said Cuban ores will be used by way of illustration in the following description.

The crude ore is dried and preheated in suitable preheating chambers and then subjected to a sulfating roast. The preheating is preferably performed by waste gases from the sulfate roasting furnaces whereby there is absorbed from these gases the last available sensible heat and their last traces of sulfur dioxid.

After the preheating, the dried ore is placed in roasting furnaces where it is subjected to a sulfating roast. This roast may be carried on in accordance with either of the methods invented by F. A. Eustis and set forth in Letters Patent of the United States granted to said Eustis January 16, 1917, No. 1,212,334, and June 19, 1917, No. 1,230,143. The roasting will preferably be done by the method described in the latter patent, that is, in the presence of an atmosphere containing sulfur dioxid gas.

The purpose of the sulfating roast is to convert into soluble sulfates as much as possible of the nickel and aluminum contained in the ore, and also incidentally to render soluble certain proportions of the manganese and chromium. A small proportion of the iron will likewise be rendered soluble although one of the principal advantages of this form of roast is that by far the greater part of the iron will be left insoluble. Experiment with the ore in question has shown that about 70% of the nickel, about 60% of the aluminum, and about 60% of the manganese may be made soluble, and also small proportions of the chromium, iron and silica.

The sulfur dioxid gas for performing the sulfating roast in accordance with said Eustis Patent No. 1,230,143 may be obtained at the start by burning pyrites or other sulfur containing substance within the furnace, or on outside hearths, and conveying the resulting sulfur dioxid gas into the roasting furnace.

After the process hereinafter described is once well under way the sulfur dioxid gas will be recovered at a later stage of the process and returned to the roasting furnaces, thus completing a cycle or circuit. A certain proportion of the sulfur will, however, always be lost mechanically and otherwise, and this loss will be continuously made up and the supply of sulfur supplemented by burning small amounts of pyrites or other sulfur containing material. The burnt pyrites cinder may be added to the leached iron ore obtained from the roasted products and sintered with it. The heat required in the roasting furnaces will be furnished in large part by the hot sulfur dioxid gas but may be supplemented so far as necessary by burning additional fuel.

After the sulfate roasting step the roasted ore will be delivered from the roasting furnaces into leaching apparatus where it will be leached with water. The leaching will be more efficient if the water is used hot, but fairly good recoveries can be made by leaching with cold water. By using a counter-current method the strength of the leached liquor may be effectively built up.

Two products will result from the leaching, namely, (1) an iron ore residue which can be sintered to produce a high grade iron ore, and (2) a liquor which will contain sulfate of aluminum, sulfate of iron, sulfate of nickel, sulfate of manganese, and sulfate of chromium.

The steps thus far described in and of themselves form no part of the present invention.

The present invention has to do mainly with the treatment of the liquor just mentioned containing sulfates of aluminum, of iron, of nickel, of manganese and of chromium.

When it is desired to reduce the amount of iron in solution or to produce pigment as well as to recover alumina and other metals or their oxids, the iron and chromium are precipitated by hydrolyzing. This will be accomplished either by dilution with water, or by adding to the liquor aluminum hydrate, or both. For this purpose freshly precipitated alumina may be used to advantage, or other alumina which has not stood in the air sufficiently long to become dehydrated and therefore inert. The freshly precipitated alumina, or aluminum hydrate, goes into solution much more readily than dehydrated alumina. By the addition of aluminum hydrate together with slight dilution with water a large proportion (about 75%) of the iron and part of the chromium contained in the liquor will be hydrolyzed, i. e., converted from sulfates into hydrates, and thereby precipitated.

The result of this hydrolyzing step is to produce on the one hand a precipitate containing about 75% of the iron and chromium together with some of the aluminum hydrate which was added to the liquor; and on the other hand a liquor containing the balance of the iron and chromium together with substantially all of the soluble nickel, aluminum, manganese and silica. These two products, namely, the precipitate and the liquor, are then treated separately.

Following first the treatment of the precipitate: The precipitate is first dehydrated by heating below a red heat and then roasted at a low temperature (just above a dull red heat) in the presence of carbonaceous material either free carbon, or in the form of hydrocarbons.

The carbonaceous material may consist of powdered soft coal, lamp black, charcoal, hard coal, fuel oil or fuel gas. It is believed that lamp black and powdered soft coal produce the best results, and by reason of the almost prohibitive cost of lamp black we recommend the use of powdered soft coal. The powdered coal is mixed with the precipitate in an amount generously in excess of the amount theoretically required, and there should be added enough additional coal to form a light blanket on top of the precipitate. This performs an important function in promoting the reactions which are desired when the subsequent recovery of the alumina is to be by such processes as the Bayer process. The roast is conducted in a reducing atmosphere.

As a result of this roasting step in the presence of carbon or carbonaceous material, two important ends are attained. Sulfur dioxid gas is driven off and is returned again to the sulfate roasting furnaces in which the ore was originally subjected to a sulfate roast. Also the precipitated sulfates by means of this roast are decomposed leaving the metals as oxids.

It would be possible by roasting said precipitates in the air without the addition of carbon to drive off the sulfur gas (chiefly as sulfur trioxid, which may be reduced to sulfur dioxid if desired); but in such case the temperature used would have to be so high that the alumina would remain insoluble in caustic soda used in such processes as the Bayer process for the subsequent recovery of the alumina, whereas the presence of the carbonaceous matter makes it possible to conduct the roast under such conditions that the resulting oxid of aluminum will be soluble.

If some other process for subsequently recovering alumina is preferred, such as forming a soluble aluminate by roasting the desulfurized material with sodium carbonate or other compound and subsequently leaching to extract the alumina, the blanket covering of soft coal may be omitted in the reducing roast described above, and after decomposing the sulfates the roasting may be finished under oxidizing conditions.

The oxids resulting from the desulfurizing roast are leached with a dilute solution of sulfuric acid (a solution of less than 1% will give satisfactory results) to remove as much as possible of the sulfur which was not driven off by the roast, and incidentally to remove a large part of the manganese. After this leaching the oxids may be treated by the Bayer process or some other process to extract the alumina. The alumina recovered at this stage is returned to the hydrolyzing stage above mentioned and furnishes part of the freshly precipitated alumina (aluminum hydrate), which is introduced into the liquor resulting from the leaching of the products of the sulfate roast, thus completing a cycle or circuit. The remainder after thus recovering the alumina will be a product containing about 98.5% iron oxid and 1.5% chromium oxid. This product will constitute a high grade pigment, such as is used for making paints, and may be marketed as such.

Returning now to the liquor from which the above described precipitates were removed by hydrolyzing, this liquor is first evaporated to dryness. The evaporation may be performed in a double or triple effect acid proof vacuum evaporator followed by drums and belts or other mechanical devices to effect complete drying of the contained sulfate salts. The dried sulfate salts consisting of sulfates of aluminum, iron, nickel, manganese and chromium will next be mixed with powdered soft coal or carbonaceous material in some other form as already described in connection with the treatment of the hydrolyzed precipitate, and subjected to a similar reducing roast.

The sulfurous gases driven off by this roast will be sent back to the sulfate roasting furnaces, completing a cycle or circuit as before, and the roasted oxids (aluminum, iron, nickel, manganese, chromium and silicon) will then be leached with a dilute solution of sulfuric acid to remove as much as possible of the sulfur not driven off by the roast, and incidentally a large part of the manganese, and may be thereafter treated by the Bayer process or other desired process for the separation of the constituents.

The products of the Bayer process will be nearly pure commercial alumina on the one hand, and a mixture of oxids of iron, nickel, manganese, chrominum and silicon on the other hand. This last mixture of oxids can be smelted to a rich alloy of nickel, manganese and iron or it may be treated for further separation of its constituents if desired.

If it is not desired to obtain a pigment the addition of the aluminum hydrate to the liquor derived from the leaching of the products of the sulfate roast may be omitted, in which case of course there will be no hydrolyzed precipitate of iron and chromium mixed with aluminum hydrate and all that part of the process relating to the treatment of such precipitate will be omitted. The liquor will, however, be treated in the manner already described and will produce substantially the same products as described, differing only quantitatively due to the fact that none of its constituents have been precipitated out of it.

In each case where sulfur dioxid gas is driven off from the dried sulfate salts, or from the hydrolyzed precipitate, by mixing the material with powdered soft coal and roasting at low temperatures, a certain amount of carbon dioxid gas and also a certain amount of sulfur trioxid will be driven off with the sulfur dioxid. The sulfur trioxid gas may then be reduced to sulfur dioxid gas, if desired, by any usual method. The admixture of carbon dioxid resulting from the combustion of the coal during the low temperature roast, when delivered into the sulfate roasting furnaces, assists to some degree in promoting the sulfating and rendering soluble all the metals which it is desired to extract.

We claim:

1. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts to drive off sulfurous gas and produce oxids of the contained metals; and thereafter recovering the alumina from said oxids.

2. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts;

thereafter roasting the dried sulfate salts to drive off sulfurous gas and produce oxids of the contained metals, returning the recovered sulfurous gas to the ore at the sulfate roasting step; and recovering the alumina from said oxids.

3. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts with carbonaceous material at a low temperature to drive off sulfur dioxid gas and produce oxids of the contained metals; and recovering the alumina from said oxids.

4. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts with carbonaceous material at a low temperature to drive off sulfur dioxid gas and produce oxids of the contained metals, the roast being conducted in a reducing atmosphere; and recovering the alumina from said oxids.

5. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts to drive off sulfurous gas and produce oxids of the contained metals, the roast being conducted first in a reducing atmosphere and finished in an oxidizing atmosphere; and thereafter recovering the alumina from said oxids.

6. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts mixed with powdered soft coal at a low temperature to drive off sulfur dioxid gas and produce oxids of the contained metals; and recovering the alumina from said oxids.

7. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts with carbonaceous material at a low temperature in a reducing atmosphere, to produce oxids of the contained metals and to drive off sulfur dioxid gas and with it carbon dioxid gas, returning the mixed sulfur dioxid gas and carbon dioxid gas to the ore at the sulfate roasting step; and recovering the alumina from said oxids.

8. The method of treating an iron ore containing incidental metals consisting of almuinum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts with carbonaceous material to drive off sulfur dioxid gas and produce oxids of the contained metals; thereafter leaching said oxids with a dilute solution of sulfuric acid; and thereafter recovering the alumina from said oxids.

9. The method of treating an iron ore containing incidental metals consisting of aluminum and one or more of the metals nickel, manganese and chromium, which comprises subjecting the ore to a sulfating roast adapted to render soluble a large proportion of the incidental metals while rendering only a small proportion of the iron soluble; thereafter leaching the roasted products to produce on the one hand a beneficiated iron ore residue, and on the other hand a liquor containing sulfates of iron and of the incidental metals; thereafter evaporating the liquor, leaving dried sulfate salts; thereafter roasting the dried sulfate salts mixed with powdered soft coal at a low temperature in a reducing atmosphere, to produce oxids of the contained metals and to drive off sulfur dioxid gas and with its carbon dioxid gas, returning the mixed sulfur dioxid gas and carbon dioxid gas to the ore at the sulfate roasting step; leaching said oxids with dilute sulfuric acid; and thereafter extracting the alumina from said oxids.

10. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; and thereafter hydrolyzing a large proportion of the iron and chromium in the liquor thereby precipitating them; and producing from the precipitate a pigment containing iron oxid and chromium oxid.

11. The method of treating an iron ore containing incidental metals consisting of aluminum and one or more of the metals nickel, maganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; and thereafter hydrolyzing a large proportion of the iron and chromium in the liquor by diluting with water, thereby precipitating them; and producing from the precipitate a pigment containing iron oxid and chromium oxid.

12. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; and thereafter hydrolyzing a large proportion of the iron and chromium in the liquor by adding aluminum hydrate and diluting with water, thereby precipitating them; and producing from the precipitate a pigment containing iron oxid and chromium oxid.

13. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to hydrolyze a large proportion of the iron and chromium and precipitate the same mixed with part of the aluminum hydrate; and thereafter extracting the alumina from said precipitate leaving as a residue a pigment containing iron oxid and chromium oxid.

14. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to hydrolyze a large proportion of the iron and chromium and precipitate the same mixed with part of the aluminum hydrate; thereafter roasting the precipitate to drive off sulfurous gas and to produce oxids of said metals; and thereafter extracting the alumina leaving as a residue a pigment containing iron oxid and chromium oxid.

15. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to hydrolyze a large proportion of the iron and chromium and precipitate the same mixed with part of the aluminum hydrate; thereafter roasting the precipitate with carbonaceous material at a low temperature to drive off sulfur dioxid gas and to produce oxids of said metals; and thereafter extracting the alumina from said oxids leaving as a residue a pigment containing iron oxid and chromium oxid.

16. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to hydrolyze a large proportion of the iron and chromium and precipitate the same mixed with part of the aluminum hydrate; thereafter roasting the precipitate with carbonaceous material at a low temperature to drive off sulfur dioxid gas and to produce oxids of said metals, said roast being conducted in a reducing atmosphere; and thereafter extracting the alumina from said oxids leaving as a residue a pigment containing iron oxid and chromium oxid.

17. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to the hydrolyze a large proportion of the iron and chromium and precipitate the same mixed with part of the aluminum hydrate; thereafter roasting the precipitate mixed with powdered soft coal at a low temperature to drive off sulfur dioxid gas and to produce oxids of the contained metals; and thereafter extracting the alumina from said oxids leaving as a residue a pigment containing iron oxid and chromium oxid.

18. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to hydrolyze a large proportion of the iron and chromium and precipitate the same mixed with part of the aluminum hydrate; thereafter leaching said precipitate with a dilute solution of sulfuric acid; and thereafter extracting the alumina from said precipitate leaving as a residue a pigment containing iron oxid and chromium oxid.

19. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; thereafter adding to the liquor aluminum hydrate to hydrolyze a large proportion of the iron and chromium and precipitate the same mixed with part of the aluminum hydrate; thereafter roasting the precipitate mixed with powdered soft coal at a low temperature to drive off sulfur dioxid gas and to produce oxids of the contained metals; thereafter leaching said oxids with a dilute solution of sulfuric acid; and thereafter extracting the alumina from said oxids leaving as a residue a pigment containing iron oxid and chromium oxid.

20. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; and thereafter precipitating from the liquor part of the iron and chromium to produce a pigment containing iron oxid and chromium oxid.

21. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; adding to the liquor freshly precipitated alumina extracted at a later step in the process, to hydrolyze a large proportion of the iron and chromium and precipitate the same mixed with part of the aluminum hydrate; extracting the alumina from the precipitate, and returning the same to the liquor for performing said hydrolyzing step, leaving as a residue a pigment containing iron oxid and chromium oxid.

22. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; adding to the liquor freshly precipitated alumina extracted at a later step in the process, to hydrolyze a large proportion of the iron and chromium and precipitate the same mixed with part of the aluminum hydrate; roasting the precipitate with carbonaceous material at a low temperature to drive off sulfur dioxid gas and produce oxids of the contained metals; extracting the alumina from the oxids, and returning the same to the liquor for performing said hydrolyzing step, leaving as a residue a pigment containing iron oxid and chromium oxid.

23. The method of treating an iron ore containing incidental metals consisting of aluminum and one or more of the metals nickel, manganese and chromium which comprises subjecting the ore to a sulfating roast adapted to render soluble a large proportion of the incidental metals and only a small proportion of the iron; thereafter leaching the roasted products to produce on the one hand an iron ore residue, and on the other hand a liquor containing sulfates of iron and of the incidental metals; adding to the liquor aluminum hydrate to hydrolyze a large proportion of the iron and chromium and precipitate the same mixed with part of the aluminum hydrate; roasting the precipitate with carbonaceous material at a low temperature to drive off sulfur dioxid gas and produce oxids of the contained metals; leaching said oxids with dilute sulfuric acid; and extracting the alumina from said oxids leaving as a residue a pigment containing iron oxid and chromium oxid.

Signed by us at Cambridge, Massachusetts, this nineteenth day of June, 1918.

CARLE R. HAYWARD.
 FREDERICK O. STILLMAN.
 HENRY M. SCHLEICHER.